(12) United States Patent
Wright et al.

(10) Patent No.: US 11,860,948 B2
(45) Date of Patent: *Jan. 2, 2024

(54) KEYED ROW SELECTION

(71) Applicant: Deephaven Data Labs LLC, Plymouth, MN (US)

(72) Inventors: Charles Wright, Cortlandt Manor, NY (US); Ryan Caudy, New York, NY (US); David R. Kent, IV, Colorado Springs, CO (US); Andrew Baranec, Deer Park, NY (US); Mark Zeldis, Randolph, NJ (US); Radu Teodorescu, New York, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/038,388

(22) Filed: Sep. 30, 2020

(65) Prior Publication Data

US 2021/0011900 A1    Jan. 14, 2021

Related U.S. Application Data

(63) Continuation of application No. 15/813,119, filed on Nov. 14, 2017, now Pat. No. 10,866,943.
(Continued)

(51) Int. Cl.
*G06F 16/903* (2019.01)
*G06F 16/23* (2019.01)
(Continued)

(52) U.S. Cl.
CPC ...... *G06F 16/90335* (2019.01); *G06F 3/0481* (2013.01); *G06F 16/128* (2019.01);
(Continued)

(58) Field of Classification Search
CPC .... G06F 16/90335; G06F 16/21; G06F 16/27; G06F 16/289; G06F 16/221; G06F 16/23;
(Continued)

(56) References Cited

U.S. PATENT DOCUMENTS 5,335,202 A   8/1994  Manning et al.
5,452,434 A   9/1995  Macdonald
(Continued)

FOREIGN PATENT DOCUMENTS

CA   2309462 A1   12/2000
EP   1406463 A2   4/2004
(Continued)

OTHER PUBLICATIONS

"About Entering Commands in the Command Window", dated Dec. 16, 2015, pp. 1-10. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
(Continued)

*Primary Examiner* — Mark D Featherstone
*Assistant Examiner* — Faezeh Forouharnejad
(74) *Attorney, Agent, or Firm* — Carmichael IP, PLLC

(57) ABSTRACT

Described are methods, systems and computer readable media for keyed row data selection and processing.

27 Claims, 10 Drawing Sheets

Related U.S. Application Data

(60) Provisional application No. 62/549,908, filed on Aug. 24, 2017.

(51) Int. Cl.

| | | |
|---|---|---|
| *G06F 16/901* | (2019.01) | |
| *G06T 11/20* | (2006.01) | |
| *G06F 16/9038* | (2019.01) | |
| *G06F 16/904* | (2019.01) | |
| *G06F 16/532* | (2019.01) | |
| *G06F 16/27* | (2019.01) | |
| *G06F 16/21* | (2019.01) | |
| *G06F 16/28* | (2019.01) | |
| *G06F 16/22* | (2019.01) | |
| *G06F 3/0481* | (2022.01) | |
| *G06F 16/11* | (2019.01) | |
| *G06F 16/18* | (2019.01) | |
| *G06F 12/02* | (2006.01) | |
| *G06F 16/48* | (2019.01) | |

(52) U.S. Cl.
CPC ............ *G06F 16/21* (2019.01); *G06F 16/221* (2019.01); *G06F 16/23* (2019.01); *G06F 16/235* (2019.01); *G06F 16/2358* (2019.01); *G06F 16/2365* (2019.01); *G06F 16/2372* (2019.01); *G06F 16/27* (2019.01); *G06F 16/289* (2019.01); *G06F 16/532* (2019.01); *G06F 16/901* (2019.01); *G06F 16/904* (2019.01); *G06F 16/9024* (2019.01); *G06F 16/9038* (2019.01); *G06T 11/206* (2013.01); *G06F 12/0253* (2013.01); *G06F 16/489* (2019.01)

(58) Field of Classification Search
CPC .. G06F 16/901; G06F 16/9038; G06F 16/904; G06F 16/2372; G06F 16/235; G06F 16/2358; G06F 16/2365; G06F 16/532; G06F 16/9024; G06F 16/128; G06F 3/0481; G06F 16/489; G06F 12/0253; G06T 11/206
See application file for complete search history.

(56) References Cited

U.S. PATENT DOCUMENTS

| | | | |
|---|---|---|---|
| 5,469,567 A | 11/1995 | Okada | |
| 5,504,885 A | 4/1996 | Alashqur | |
| 5,530,939 A | 6/1996 | Mansfield et al. | |
| 5,568,632 A | 10/1996 | Nelson | |
| 5,673,369 A | 9/1997 | Kim | |
| 5,701,461 A | 12/1997 | Dalal et al. | |
| 5,701,467 A | 12/1997 | Freeston | |
| 5,764,953 A | 6/1998 | Collins et al. | |
| 5,787,411 A * | 7/1998 | Groff | G06F 16/2428 |
| 5,787,428 A | 7/1998 | Hart | |
| 5,806,059 A | 9/1998 | Tsuchida et al. | |
| 5,808,911 A | 9/1998 | Tucker et al. | |
| 5,859,972 A | 1/1999 | Subramaniam et al. | |
| 5,873,075 A | 2/1999 | Cochrane et al. | |
| 5,875,334 A | 2/1999 | Chow et al. | |
| 5,878,415 A | 3/1999 | Olds | |
| 5,890,167 A | 3/1999 | Bridge et al. | |
| 5,899,990 A | 5/1999 | Maritzen et al. | |
| 5,920,860 A | 7/1999 | Maheshwari et al. | |
| 5,943,672 A | 8/1999 | Yoshida | |
| 5,960,087 A | 9/1999 | Tribble et al. | |
| 5,991,810 A | 11/1999 | Shapiro et al. | |
| 5,999,918 A | 12/1999 | Williams et al. | |
| 6,006,220 A | 12/1999 | Haderle et al. | |
| 6,026,390 A | 2/2000 | Ross et al. | |
| 6,032,144 A | 2/2000 | Srivastava et al. | |
| 6,032,148 A | 2/2000 | Wilkes | |
| 6,038,563 A | 3/2000 | Bapat et al. | |
| 6,058,394 A | 5/2000 | Bakow et al. | |
| 6,061,684 A | 5/2000 | Glasser et al. | |
| 6,105,017 A | 8/2000 | Kleewein et al. | |
| 6,122,514 A | 9/2000 | Spaur et al. | |
| 6,138,112 A | 10/2000 | Slutz | |
| 6,160,548 A | 12/2000 | Lea et al. | |
| 6,253,195 B1 | 6/2001 | Hudis et al. | |
| 6,266,669 B1 | 7/2001 | Brodersen et al. | |
| 6,289,357 B1 | 9/2001 | Parker | |
| 6,292,803 B1 | 9/2001 | Richardson et al. | |
| 6,304,876 B1 | 10/2001 | Isip | |
| 6,317,728 B1 | 11/2001 | Kane | |
| 6,327,702 B1 | 12/2001 | Sauntry et al. | |
| 6,336,114 B1 | 1/2002 | Garrison | |
| 6,353,819 B1 | 3/2002 | Edwards et al. | |
| 6,367,068 B1 | 4/2002 | Vaidyanathan et al. | |
| 6,389,414 B1 | 5/2002 | Delo et al. | |
| 6,389,462 B1 | 5/2002 | Cohen et al. | |
| 6,397,206 B1 | 5/2002 | Hill et al. | |
| 6,438,537 B1 | 8/2002 | Netz et al. | |
| 6,446,069 B1 | 9/2002 | Yaung et al. | |
| 6,460,037 B1 | 10/2002 | Weiss et al. | |
| 6,473,750 B1 | 10/2002 | Petculescu et al. | |
| 6,487,552 B1 | 11/2002 | Lei et al. | |
| 6,496,833 B1 | 12/2002 | Goldberg et al. | |
| 6,505,189 B1 | 1/2003 | Au et al. | |
| 6,505,241 B2 | 1/2003 | Pitts | |
| 6,510,551 B1 | 1/2003 | Miller | |
| 6,519,604 B1 | 2/2003 | Acharya et al. | |
| 6,530,075 B1 | 3/2003 | Beadle et al. | |
| 6,538,651 B1 | 3/2003 | Hayman et al. | |
| 6,546,402 B1 | 4/2003 | Beyer et al. | |
| 6,553,375 B1 | 4/2003 | Huang et al. | |
| 6,584,474 B1 | 6/2003 | Pereira | |
| 6,604,104 B1 | 8/2003 | Smith | |
| 6,618,720 B1 | 9/2003 | Au et al. | |
| 6,631,374 B1 | 10/2003 | Klein et al. | |
| 6,640,234 B1 | 10/2003 | Coffen et al. | |
| 6,697,880 B1 | 2/2004 | Dougherty | |
| 6,701,415 B1 | 3/2004 | Hendren | |
| 6,714,962 B1 | 3/2004 | Helland et al. | |
| 6,725,243 B2 | 4/2004 | Snapp | |
| 6,732,100 B1 | 5/2004 | Brodersen et al. | |
| 6,745,332 B1 | 6/2004 | Wong et al. | |
| 6,748,374 B1 | 6/2004 | Madan et al. | |
| 6,748,455 B1 | 6/2004 | Tinson et al. | |
| 6,760,719 B1 | 7/2004 | Hanson et al. | |
| 6,775,660 B2 | 8/2004 | Lin et al. | |
| 6,785,668 B1 | 8/2004 | Polo et al. | |
| 6,795,851 B1 | 9/2004 | Noy | |
| 6,801,908 B1 | 10/2004 | Fuloria et al. | |
| 6,816,855 B2 | 11/2004 | Hartel et al. | |
| 6,820,082 B1 | 11/2004 | Cook et al. | |
| 6,829,620 B2 | 12/2004 | Michael et al. | |
| 6,832,229 B2 | 12/2004 | Reed | |
| 6,851,088 B1 | 2/2005 | Conner et al. | |
| 6,882,994 B2 | 4/2005 | Yoshimura et al. | |
| 6,925,472 B2 | 8/2005 | Kong | |
| 6,934,717 B1 | 8/2005 | James | |
| 6,947,928 B2 | 9/2005 | Dettinger et al. | |
| 6,983,291 B1 | 1/2006 | Cochrane et al. | |
| 6,985,895 B2 | 1/2006 | Witkowski et al. | |
| 6,985,899 B2 | 1/2006 | Chan et al. | |
| 6,985,904 B1 | 1/2006 | Kaluskar et al. | |
| 7,020,649 B2 | 3/2006 | Cochrane et al. | |
| 7,024,414 B2 | 4/2006 | Sah et al. | |
| 7,031,962 B2 | 4/2006 | Moses | |
| 7,047,484 B1 | 5/2006 | Becker et al. | |
| 7,058,657 B1 | 6/2006 | Berno | |
| 7,089,228 B2 | 8/2006 | Arnold et al. | |
| 7,089,245 B1 | 8/2006 | George et al. | |
| 7,096,216 B2 | 8/2006 | Anonsen | |
| 7,099,927 B2 | 8/2006 | Cudd et al. | |
| 7,103,608 B1 | 9/2006 | Ozbutun et al. | |
| 7,110,997 B1 | 9/2006 | Turkel et al. | |
| 7,127,462 B2 | 10/2006 | Hiraga et al. | |
| 7,146,357 B2 | 12/2006 | Suzuki et al. | |

(56) References Cited

U.S. PATENT DOCUMENTS

| | | |
|---|---|---|
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,523,462 B1 | 4/2009 | Nesamoney et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,596,550 B2 | 9/2009 | Mordvinov et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,711,788 B2 | 5/2010 | Ran et al. |
| 7,747,640 B2 * | 6/2010 | Dettinger .............. G06F 16/284 711/146 |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,895,191 B2 | 2/2011 | Colossi et al. |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,623 B2 | 5/2012 | Lendermann et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | Macintyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,775,412 B2 | 7/2014 | Day et al. |
| 8,788,254 B2 | 7/2014 | Peloski |
| 8,793,243 B2 | 7/2014 | Weyerhaeuser et al. |
| 8,805,875 B1 | 8/2014 | Bawcom et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,984,579 B2 | 3/2015 | Cohen et al. |
| 8,996,864 B2 | 3/2015 | Maigne et al. |
| 9,002,876 B2 | 4/2015 | Gatter |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 | 7/2016 | Acuña et al. |
| 9,477,702 B1 | 10/2016 | Ramachandran et al. |
| 9,563,486 B1 | 2/2017 | Narsude et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent, IV et al. |
| 9,633,060 B2 | 4/2017 | Caudy et al. |

(56) References Cited

U.S. PATENT DOCUMENTS

| | | |
|---|---|---|
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,842,031 B1 | 12/2017 | Kharatishvili |
| 9,847,917 B2 | 12/2017 | Varney et al. |
| 9,852,231 B1 | 12/2017 | Ravi et al. |
| 9,886,469 B2 | 2/2018 | Kent, IV et al. |
| 9,898,496 B2 | 2/2018 | Caudy et al. |
| 9,934,266 B2 | 4/2018 | Wright et al. |
| 9,990,224 B2 | 6/2018 | Boldt et al. |
| 10,002,153 B2 | 6/2018 | Teodorescu et al. |
| 10,002,154 B1 | 6/2018 | Kent, IV et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 10,521,449 B1 | 12/2019 | Schwartz et al. |
| 10,783,191 B1 | 9/2020 | Caudy et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0004964 A1 | 1/2003 | Cameron et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0115212 A1 | 6/2003 | Hornibrook et al. |
| 2003/0167261 A1 | 9/2003 | Grust et al. |
| 2003/0177139 A1 | 9/2003 | Cameron et al. |
| 2003/0182261 A1 | 9/2003 | Patterson |
| 2003/0187744 A1 | 10/2003 | Goodridge |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dettinger et al. |
| 2004/0015566 A1 | 1/2004 | Anderson et al. |
| 2004/0076155 A1 | 4/2004 | Yajnik et al. |
| 2004/0090472 A1 | 5/2004 | Risch et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0205048 A1 | 10/2004 | Pizzo et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1 | 3/2005 | Robison et al. |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0144189 A1 | 6/2005 | Edwards et al. |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0123024 A1 | 6/2006 | Sathyanarayan et al. |
| 2006/0131383 A1 | 6/2006 | Battagin et al. |
| 2006/0136361 A1 | 6/2006 | Peri et al. |
| 2006/0136380 A1 | 6/2006 | Purcell |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0235786 A1 | 10/2006 | DiSalvo |
| 2006/0253311 A1 | 11/2006 | Yin et al. |
| 2006/0268712 A1 | 11/2006 | Deen et al. |
| 2006/0271510 A1 | 11/2006 | Harward et al. |
| 2006/0277162 A1 | 12/2006 | Smith |
| 2006/0277319 A1 | 12/2006 | Elien et al. |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0050329 A1 | 3/2007 | Chikusa et al. |
| 2007/0073765 A1 | 3/2007 | Chen |
| 2007/0101252 A1 | 5/2007 | Chamberlain et al. |
| 2007/0113014 A1 | 5/2007 | Manolov et al. |
| 2007/0116287 A1 | 5/2007 | Rasizade et al. |
| 2007/0118619 A1 | 5/2007 | Schwesig et al. |
| 2007/0140480 A1 | 6/2007 | Yao |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0294319 A1 | 12/2007 | Mankad et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |
| 2008/0072150 A1 | 3/2008 | Chan et al. |
| 2008/0097748 A1 | 4/2008 | Haley et al. |
| 2008/0120283 A1 | 5/2008 | Liu et al. |
| 2008/0155565 A1 | 6/2008 | Poduri |
| 2008/0168135 A1 | 7/2008 | Redlich et al. |
| 2008/0172639 A1 | 7/2008 | Keysar et al. |
| 2008/0222159 A1 | 9/2008 | Aranha et al. |
| 2008/0235238 A1 | 9/2008 | Jalobeanu et al. |
| 2008/0263179 A1 | 10/2008 | Buttner et al. |
| 2008/0276241 A1 | 11/2008 | Bajpai et al. |
| 2008/0319951 A1 | 12/2008 | Ueno et al. |
| 2009/0019029 A1 | 1/2009 | Tommaney et al. |
| 2009/0022095 A1 | 1/2009 | Spaur et al. |
| 2009/0024615 A1 | 1/2009 | Pedro et al. |
| 2009/0037391 A1 | 2/2009 | Agrawal et al. |
| 2009/0037500 A1 | 2/2009 | Kirshenbaum |
| 2009/0055370 A1 | 2/2009 | Dagum et al. |
| 2009/0083215 A1 | 3/2009 | Burger |
| 2009/0089312 A1 | 4/2009 | Chi et al. |
| 2009/0157723 A1 | 6/2009 | Peuter et al. |
| 2009/0248618 A1 | 10/2009 | Carlson et al. |
| 2009/0248902 A1 | 10/2009 | Blue |
| 2009/0254516 A1 | 10/2009 | Meiyyappan et al. |
| 2009/0271472 A1 | 10/2009 | Scheifler et al. |
| 2009/0300770 A1 | 12/2009 | Rowney et al. |
| 2009/0319058 A1 | 12/2009 | Rovaglio et al. |
| 2009/0319484 A1 | 12/2009 | Golbandi et al. |
| 2009/0327242 A1 | 12/2009 | Brown et al. |
| 2010/0017499 A1 | 1/2010 | Martinent et al. |
| 2010/0023952 A1 | 1/2010 | Sandoval et al. |
| 2010/0030734 A1 | 2/2010 | Chunilal |
| 2010/0036801 A1 | 2/2010 | Pirvali et al. |
| 2010/0042587 A1 | 2/2010 | Johnson et al. |
| 2010/0047760 A1 | 2/2010 | Best et al. |
| 2010/0049715 A1 | 2/2010 | Jacobsen et al. |
| 2010/0057835 A1 | 3/2010 | Little |
| 2010/0070721 A1 | 3/2010 | Pugh et al. |
| 2010/0088309 A1 | 4/2010 | Petculescu et al. |
| 2010/0114890 A1 | 5/2010 | Hagar et al. |
| 2010/0161555 A1 | 6/2010 | Nica et al. |
| 2010/0161565 A1 | 6/2010 | Lee et al. |

(56) References Cited

U.S. PATENT DOCUMENTS

| | | |
|---|---|---|
| 2010/0174991 A1 | 7/2010 | Andersen et al. |
| 2010/0186082 A1 | 7/2010 | Adki et al. |
| 2010/0199161 A1 | 8/2010 | Aureglia et al. |
| 2010/0205017 A1 | 8/2010 | Sichelman et al. |
| 2010/0205351 A1 | 8/2010 | Wiener et al. |
| 2010/0281005 A1 | 11/2010 | Carlin et al. |
| 2010/0281071 A1 | 11/2010 | Ben-Zvi et al. |
| 2010/0293334 A1 | 11/2010 | Kun et al. |
| 2011/0029535 A1 | 2/2011 | Cole |
| 2011/0126110 A1 | 5/2011 | Vilke et al. |
| 2011/0126154 A1 | 5/2011 | Boehler et al. |
| 2011/0153603 A1 | 6/2011 | Adiba et al. |
| 2011/0161378 A1 | 6/2011 | Williamson |
| 2011/0167020 A1 | 7/2011 | Yang et al. |
| 2011/0178984 A1 | 7/2011 | Talius et al. |
| 2011/0194563 A1 | 8/2011 | Shen et al. |
| 2011/0213775 A1 | 9/2011 | Franke et al. |
| 2011/0219020 A1 | 9/2011 | Oks et al. |
| 2011/0231389 A1 | 9/2011 | Suma et al. |
| 2011/0314019 A1 | 12/2011 | Peris |
| 2011/0320411 A1 | 12/2011 | Henderson |
| 2012/0005238 A1 | 1/2012 | Jebara et al. |
| 2012/0110030 A1 | 5/2012 | Pomponio |
| 2012/0144234 A1 | 6/2012 | Clark et al. |
| 2012/0151245 A1 | 6/2012 | Chang et al. |
| 2012/0159303 A1 | 6/2012 | Friedrich et al. |
| 2012/0191446 A1 | 7/2012 | Binsztok et al. |
| 2012/0191582 A1 | 7/2012 | Rance et al. |
| 2012/0192096 A1 | 7/2012 | Bowman et al. |
| 2012/0197868 A1 | 8/2012 | Fauser et al. |
| 2012/0209886 A1 | 8/2012 | Henderson |
| 2012/0215741 A1 | 8/2012 | Poole et al. |
| 2012/0221528 A1 | 8/2012 | Renkes |
| 2012/0246052 A1 | 9/2012 | Taylor et al. |
| 2012/0246094 A1 | 9/2012 | Hsu et al. |
| 2012/0254143 A1 | 10/2012 | Varma et al. |
| 2012/0259759 A1 | 10/2012 | Crist et al. |
| 2012/0296846 A1 | 11/2012 | Teeter |
| 2013/0041946 A1 | 2/2013 | Joel et al. |
| 2013/0080514 A1 | 3/2013 | Gupta et al. |
| 2013/0086107 A1 | 4/2013 | Genochio et al. |
| 2013/0166551 A1* | 6/2013 | Wong ............... G06Q 10/06 707/736 |
| 2013/0166556 A1 | 6/2013 | Baeumges et al. |
| 2013/0173667 A1 | 7/2013 | Soderberg et al. |
| 2013/0179460 A1 | 7/2013 | Cervantes et al. |
| 2013/0185619 A1 | 7/2013 | Ludwig |
| 2013/0191370 A1 | 7/2013 | Chen et al. |
| 2013/0198232 A1 | 8/2013 | Shamgunov et al. |
| 2013/0226959 A1 | 8/2013 | Dittrich et al. |
| 2013/0246560 A1 | 9/2013 | Feng et al. |
| 2013/0263123 A1 | 10/2013 | Zhou et al. |
| 2013/0290243 A1 | 10/2013 | Hazel et al. |
| 2013/0304725 A1 | 11/2013 | Nee et al. |
| 2013/0304744 A1 | 11/2013 | McSherry et al. |
| 2013/0311352 A1 | 11/2013 | Kayanuma et al. |
| 2013/0311488 A1 | 11/2013 | Erdogan et al. |
| 2013/0318129 A1 | 11/2013 | Vingralek et al. |
| 2013/0332487 A1 | 12/2013 | Ramesh et al. |
| 2013/0346365 A1 | 12/2013 | Kan et al. |
| 2014/0019494 A1 | 1/2014 | Tang |
| 2014/0026121 A1 | 1/2014 | Jackson et al. |
| 2014/0040203 A1 | 2/2014 | Lu et al. |
| 2014/0046638 A1 | 2/2014 | Peloski |
| 2014/0059646 A1 | 2/2014 | Hannel et al. |
| 2014/0082470 A1 | 3/2014 | Trebas et al. |
| 2014/0082724 A1 | 3/2014 | Pearson et al. |
| 2014/0095365 A1 | 4/2014 | Potekhina et al. |
| 2014/0115037 A1 | 4/2014 | Liu et al. |
| 2014/0136521 A1 | 5/2014 | Pappas |
| 2014/0143123 A1 | 5/2014 | Banke et al. |
| 2014/0149947 A1 | 5/2014 | Blyumen |
| 2014/0149997 A1 | 5/2014 | Kukreja et al. |
| 2014/0156618 A1 | 6/2014 | Castellano |
| 2014/0156632 A1 | 6/2014 | Yu et al. |
| 2014/0173023 A1 | 6/2014 | Varney et al. |
| 2014/0181036 A1 | 6/2014 | Dhamankar et al. |
| 2014/0181081 A1 | 6/2014 | Veldhuizen |
| 2014/0188924 A1 | 7/2014 | Ma et al. |
| 2014/0195558 A1 | 7/2014 | Murthy et al. |
| 2014/0201194 A1 | 7/2014 | Reddy et al. |
| 2014/0215446 A1 | 7/2014 | Araya et al. |
| 2014/0222768 A1 | 8/2014 | Rambo et al. |
| 2014/0229506 A1 | 8/2014 | Lee |
| 2014/0229874 A1 | 8/2014 | Strauss |
| 2014/0244687 A1 | 8/2014 | Shmueli et al. |
| 2014/0279810 A1 | 9/2014 | Mann et al. |
| 2014/0280029 A1 | 9/2014 | Ding et al. |
| 2014/0280372 A1 | 9/2014 | Huras et al. |
| 2014/0280522 A1 | 9/2014 | Watte |
| 2014/0282227 A1 | 9/2014 | Nixon et al. |
| 2014/0282444 A1 | 9/2014 | Araya et al. |
| 2014/0282540 A1 | 9/2014 | Bonnet et al. |
| 2014/0289700 A1 | 9/2014 | Srinivasaraghavan et al. |
| 2014/0292765 A1 | 10/2014 | Maruyama et al. |
| 2014/0297611 A1 | 10/2014 | Abbour et al. |
| 2014/0317084 A1 | 10/2014 | Chaudhry et al. |
| 2014/0321280 A1 | 10/2014 | Evans |
| 2014/0324821 A1 | 10/2014 | Meiyyappan et al. |
| 2014/0330700 A1 | 11/2014 | Studnitzer et al. |
| 2014/0330807 A1 | 11/2014 | Weyerhaeuser et al. |
| 2014/0344186 A1 | 11/2014 | Nadler |
| 2014/0344391 A1 | 11/2014 | Varney et al. |
| 2014/0358892 A1 | 12/2014 | Nizami et al. |
| 2014/0359574 A1 | 12/2014 | Beckwith et al. |
| 2014/0369550 A1 | 12/2014 | Davis et al. |
| 2014/0372482 A1 | 12/2014 | Martin et al. |
| 2014/0380051 A1 | 12/2014 | Edward et al. |
| 2015/0019516 A1 | 1/2015 | Wein et al. |
| 2015/0026155 A1 | 1/2015 | Martin |
| 2015/0032789 A1 | 1/2015 | Nguyen et al. |
| 2015/0067640 A1 | 3/2015 | Booker et al. |
| 2015/0074066 A1 | 3/2015 | Li et al. |
| 2015/0082218 A1 | 3/2015 | Affoneh et al. |
| 2015/0088894 A1 | 3/2015 | Czarlinska et al. |
| 2015/0095381 A1 | 4/2015 | Chen et al. |
| 2015/0120261 A1 | 4/2015 | Giannacopoulos et al. |
| 2015/0127599 A1 | 5/2015 | Schiebeler |
| 2015/0154262 A1 | 6/2015 | Yang et al. |
| 2015/0172117 A1 | 6/2015 | Dolinsky et al. |
| 2015/0188778 A1 | 7/2015 | Asayag et al. |
| 2015/0205588 A1 | 7/2015 | Bates et al. |
| 2015/0205589 A1 | 7/2015 | Dally |
| 2015/0254298 A1 | 9/2015 | Bourbonnais et al. |
| 2015/0269199 A1 | 9/2015 | McHugh et al. |
| 2015/0304182 A1 | 10/2015 | Brodsky et al. |
| 2015/0310051 A1 | 10/2015 | An et al. |
| 2015/0317359 A1 | 11/2015 | Tran et al. |
| 2015/0356157 A1 | 12/2015 | Anderson et al. |
| 2016/0004716 A1 | 1/2016 | Akirav et al. |
| 2016/0026383 A1* | 1/2016 | Lee ............... G06F 3/04886 715/773 |
| 2016/0026442 A1 | 1/2016 | Chhaparia |
| 2016/0026684 A1 | 1/2016 | Mukherjee et al. |
| 2016/0065670 A1 | 3/2016 | Kimmel et al. |
| 2016/0085772 A1 | 3/2016 | Vermeulen et al. |
| 2016/0092599 A1 | 3/2016 | Barsness et al. |
| 2016/0103897 A1 | 4/2016 | Nysewander et al. |
| 2016/0125018 A1 | 5/2016 | Tomoda et al. |
| 2016/0147748 A1 | 5/2016 | Florendo et al. |
| 2016/0171070 A1 | 6/2016 | Hrle et al. |
| 2016/0179754 A1 | 6/2016 | Borza et al. |
| 2016/0188591 A1 | 6/2016 | Bestler et al. |
| 2016/0191508 A1 | 6/2016 | Bestler et al. |
| 2016/0253294 A1 | 9/2016 | Allen et al. |
| 2016/0306709 A1 | 10/2016 | Shaull |
| 2016/0316038 A1 | 10/2016 | Jolfaei |
| 2016/0335281 A1 | 11/2016 | Teodorescu et al. |
| 2016/0335304 A1 | 11/2016 | Teodorescu et al. |
| 2016/0335317 A1 | 11/2016 | Teodorescu et al. |
| 2016/0335323 A1 | 11/2016 | Teodorescu et al. |
| 2016/0335330 A1 | 11/2016 | Teodorescu et al. |
| 2016/0335361 A1 | 11/2016 | Teodorescu et al. |
| 2017/0032016 A1 | 2/2017 | Zinner et al. |

(56) References Cited

U.S. PATENT DOCUMENTS

| | | |
|---|---|---|
| 2017/0048774 A1 | 2/2017 | Cheng et al. |
| 2017/0161514 A1 | 6/2017 | Dettinger et al. |
| 2017/0177677 A1 | 6/2017 | Wright et al. |
| 2017/0185385 A1 | 6/2017 | Kent, IV et al. |
| 2017/0192910 A1 | 7/2017 | Wright et al. |
| 2017/0206229 A1 | 7/2017 | Caudy et al. |
| 2017/0206256 A1 | 7/2017 | Tsirogiannis et al. |
| 2017/0235794 A1 | 8/2017 | Wright et al. |
| 2017/0235798 A1 | 8/2017 | Wright et al. |
| 2017/0249350 A1 | 8/2017 | Wright et al. |
| 2017/0270150 A1 | 9/2017 | Wright et al. |
| 2017/0316046 A1 | 11/2017 | Caudy et al. |
| 2017/0329740 A1* | 11/2017 | Crawford ............ H04L 67/1097 |
| 2017/0357708 A1 | 12/2017 | Ramachandran et al. |
| 2017/0359415 A1 | 12/2017 | Venkatraman et al. |
| 2018/0004796 A1 | 1/2018 | Kent, IV et al. |
| 2018/0011891 A1 | 1/2018 | Wright et al. |
| 2018/0052879 A1 | 2/2018 | Wright |
| 2018/0137175 A1 | 5/2018 | Teodorescu et al. |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

"Change Data Capture", Oracle Database Online Documentation 11g Release 1 (11.1), dated Apr. 5, 2016, pp. 1-59. Retreived from https://web.archive.org/web/20160405032625/http://docs.oracle.com/cd/B28359_01/server.111/b28313/cdc.htm.

"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.

"Definition of Multicast" by Lexico powered by Oxford at https://www.lexico.com/en/definition/multicast, 2019, p. 1.

"GNU Emacs Manual", dated Apr. 15, 2016, pp. 43-47. Retrieved from https://web.archive.org/web/20160415175915/http://www.gnu.org/software/emacs/manual/html_mono/emacs.html.

"Google Protocol RPC Library Overview", dated Apr. 27, 2016, pp. 1-9. Retrieved from https://cloud.google.com/appengine/docs/python/tools/protorpc/ (last accessed Jun. 16, 2016).

"IBM—What is HBase?", dated Sep. 6, 2015, pp. 1-3. Retrieved from https://web.archive.org/web/20150906022050/http://www-01.ibm.com/software/data/infosphere/hadoop/hbase/.

"IBM Informix TimeSeries data management", dated Jan. 18, 2016, pp.1-2. Retreived from https://web.archive.org/web120160118072141/http://www-01.ibm.com/software/data/informix/timeseries/.

"IBM InfoSphere BigInsights 3.0.0—Importing data from and exporting data to D32 by using Sqoop", dated Jan. 15, 2015, p. 1 . Retrieved from https://web.archive.org/web/20150115034058/http://www-01.ibm.com/support/knowledgecenter/SSPT3X_3.0.0/com.ibm.swg.im.infospherebiginsights.import.doc/doc/data_warehouse_sqoop.html.

"Maximize Data Value with Very Large Database Management by SAP Sybase IQ", dated 2013, pp. 1-8. Retrieved from http://www.sap.com/bin/sapcom/en_us/downloadasset.2013-06-jun-11-11.maximize-data-value-with-very-large-database-management-by-sap-sybase-iq-pdf.html.

"Microsoft Azure—Managing Access Control Lists (ACLs) for Endpoints by using PowerShell", dated Nov. 12, 2014, pp. 1-4. Retrieved from https://web.archive.org/web120150110170715/http://msdn.microsoft.com/en-us/library/azure/dn376543.aspx.

"Oracle Big Data Appliance—Perfect Balance Java API", dated Sep. 20, 2015, p. 1. Retrieved from https://web.archive.org/web/20131220040005/http://docs.oracle.com/cd/E41604_01/doc.22/e41667/toc.htm.

"Oracle Big Data Appliance—X5-2", dated Sep. 6, 2015, pp. 1-9. Retreived from https://web.archive.org/web/20150906185409/http://www.oracle.com/technetwork/database/bigdata-appliance/overview/bigdataappliance-datasheet-1883358.pdf.

"Oracle Big Data Appliance Software User's Guide", dated Feb. 201, pp. 1-166. Retreived from https://docs.oracle.com/cd/E55905_01/doc.40/e55814.pdf.

"SAP HANA Administration Guide", dated Mar. 29, 2016, pp. 290-294. Retrieved from https://web.archive.org/web120160417053656/http://help.sap.com/hana/SAP_HANA_Administration_Guide_en.pdf.

"Sophia Database—Architecture", dated Jan. 18,2016, pp. 1-7. Retrieved from https://web.archive.org/web/20160118052919/http://sphia.org/architecture.html.

"Tracking Data Changes", SQL Server 2008 R2, dated Sep. 22, 2015, pp. 1-3. Retreived from https://web.archive.org/web120150922000614/https://technet.microsoft.com/en-us/library/bb933994(v=sql.105).aspx.

"Use Formula AutoComplete", dated 2010, pp. 1-8. Retrieved from https://support.office.com/en-us/article/Use-Formula-AutoComplete-c7c46fa6-3a94-4150-a2f7-34140c1ee4d9 (last accessed Jun. 16, 2016).

"What is a Key-Value Database?" at https://database.guide/what-is-a-key-value-database, Database Concepts, NOSQL, 2019 Database guide, Jun. 21, 2016, pp. 1-7.

Adelfio et al. "Schema Extraction for Tabular Data on the Web", Proceedings of the VLDB Endowment, vol. 6, No. 6. Apr. 2013, pp. 1-12. Retrieved from http://www.cs.umd.edu/~hjs/pubs/spreadsheets-vldb13.pdf.

Azbel, Maria, How to hide and group columns in Excel AbleBits (2014), pp. 1-7. https://www.ablebits.com/office-addins-blog/2014/08/06/excel-hide-columns/ (last visited Jan. 18, 2019).

Borror, Jefferey A. "Q for Mortals 2.0", dated Nov. 1, 201, pp. 1-227. Retrieved from http://code.kx.com/wiki/JB:QforMortals2/contents.

Breitbart, Update Propagation Protocols For Replicated Databases, SIGMOD '99 Philadelphia PA, 1999, pp. 97-108.

Cheusheva, Svetlana, Excel formulas for conditional formatting based on another cell AbleBits (2014), pp. 1-11, https://www.ablebits.com/office-addins-blog/2014/06/10/excel-conditional-formatting-formulas/comment-page-6/ (last visited Jan. 14, 2019).

Cheusheva, Svetlana. "How to change the row color based on a cell's value in Excel", dated Oct. 29, 2013, pp. 1-80. Retrieved from https://www.ablebits.com/office-addins-blog/2013/10/29/excel-change-row-background-color/ (last accessed Jun. 16, 2016).

Decision on Pre-Appeal Conference Request mailed Nov. 20, 2017, in U.S. Appl. No. 15/154,997.

Dodge, Mark & Craig Stinson, Microsoft Excel 2010 inside out (2011), pp. 1-5.

Gai, Lei et al. "An Efficient Summary Graph Driven Method for RDF Query Processing", dated Oct. 27, 2015, pp. 1-12. Retreived from http://arxiv.org/pdf/1510.07749.pdf.

Hartle, Thom, Conditional Formatting in Excel using CQG's RTD Bate Function (2011), pp. 1-5, http://news.cqg.com/blogs/exce/l2011/05/conditional-formatting-excel-using-cqgs-rtd-bate-function (last visited Apr. 3, 2019).

International Search Report and Written Opinion dated Aug. 18, 2016, in International Appln. No. PCT/US2016/032582 filed May 14, 2016.

International Search Report and Written Opinion dated Aug. 18, 2016, in International Appln. No. PCT/US2016/032584 filed May 14, 2016.

International Search Report and Written Opinion dated Aug. 18, 2016, in International Appln. No. PCT/US2016/032588 filed May 14, 2016.

(56) References Cited

OTHER PUBLICATIONS

International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.
International Search Report and Written Opinion dated Aug. 18, 2016, in International Appln. No. PCT/US2016/032599 filed May 14, 2016.
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008, pp. 1-7. Retrieved from http://www.oracle.com/technetwork/articles/adf/jellema-adfcellhighlighting-087850.html (last accessed Jun. 16, 2016).
Kramer, The Combining Dag: A Technique for Parallel Data Flow Analysis, IEEE Transactions On Parallel and Distributed Systems, vol. 5, No. 8, Aug. 1994, pp. 805-813.
Luo, Yuan. "A Multi-Agent Decision Support System for Stock Trading", IEEE Network, January/Feb. 2002. pp. 1-9. Retrieved from http://www.reading.ac.uk/AcaDepts/si/sisweb13/ais/papers/journal12-A%20multi-agent%20Framework.pdf.
Luo, Yuan. "A Multi-Agent Decision Support System for Stock Trading", IEEE Network, Jan./Feb. 2002. pp. 1-9. Retrieved from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science, pp. 1-68.
Mariyappan, Balakrishnan. "10 Useful Linux Bash_Completion Complete Command Examples (Bash Command Line Completion on Steroids)", dated Dec. 2, 2013, pp. 1-12. Retrieved from http://www.thegeekstuff.com/2013/12/bash-completion-complete/ (last accessed Jun. 16, 2016).
McKinney, Wes & PyData Development Team. "pandas: powerful Python data analysis toolkit, Release 0.16.1" Dated May 11, 2015, pp. 1-1661. Retrieved from: http://pandas.pydata.org/pandas-docs/version/0.16.1/index.html.
McKinney, Wes & PyData Development Team. "pandas: powerful Python data analysis toolkit, Release 0.18.1" Dated May 3, 2016, pp. Jan. 2017. Retrieved from: http://pandas.pydata.org/pandas-docs/version/0.18.1/index.html.
Murray, Derek G. et al. "Naiad: a timely dataflow system." SOSP '13 Proceedings of the Twenty-Fourth ACM Symposium on Operating Systems Principles. pp. 439-455. Nov. 2013.
Palpanas, Themistoklis et al. "Incremental Maintenance for Non-Distributive Aggregate Functions", Proceedings of the 28th VLDB Conference, 2002, pp. 1-12. Retreived from http://www.vldb.org/conf/2002/S22P04.pdf.
Posey, Brien, "How to Combine PowerShell Cmdlets", Jun. 14, 2013 Redmond the Independent Voice of the Microsoft Community (Year: 2013), pp. 1-10.
PowerShell Team, Intellisense in Windows PowerShell ISE 3.0, dated Jun. 12, 2012, Windows PowerShell Blog, pp. 1-6. Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, pp. 1-9. retrieved Aug. 15, 2016, retrieved from the Internet.
Sobell, Mark G. "A Practical Guide to Linux, Commands, Editors and Shell Programming." Third Edition, dated Sep. 14, 2012, pp. 1-34. Retrieved from: http://techbus.safaribooksonline.com/book/operating-systems-and-server-administration/linux/9780133085129.
Wu, Buwen et al. "Scalable SPARQL Querying using Path Partitioning", 31st IEEE International Conference on Data Engineering (ICDE 2015), Seoul, Korea, Apr. 13-17, 2015, pp. 1-12. Retreived from http://imada.sdu.dk/~zhou/papers/icde2015.pdf.

* cited by examiner

KEYED ROW SELECTION

This application is a continuation of U.S. application Ser. No. 15/813,119, entitled "Keyed Row Selection" and filed on Nov. 14, 2017, which claims the benefit of U.S. Provisional Application No. 62/549,908, entitled "COMPUTER DATA SYSTEM" and filed on Aug. 24, 2017, which is incorporated herein by reference in its entirety.

Embodiments relate generally to computer data systems, and more particularly, to methods, systems and computer readable media for keyed row data selection and processing.

Some graphical user interfaces may provide a display of information from a database query result or other computer data system data object or source. Data selected on a graphical user interface may occur within a dynamically updating display of data (e.g., a query result) that is changing over time. A need may exist to provide for a selection of data to persist within a dynamically updating data object or data source, even when such selection is no longer visible within the graphical user interface.

Some implementations were conceived in light of the above mentioned needs, problems and/or limitations, among other things.

Some implementations can include a computer-implemented method for processing keyed row selection of a computer data system data object. The method can include receiving, at a processor, a selection of one or more keyed rows of the computer data system data object, the selection being received from a graphical user interface that is displaying at least a portion of data from the computer data system object, and adding, using the processor, one or more key values corresponding to the selection to a selected key values set stored in a computer readable medium coupled to the processor. The method can also include receiving, at the processor, an indication of an operation that utilizes data corresponding to the one or more key values, and determining, at the processor, whether the data corresponding to the one or more key values is stored within a local data store. The method can further include, when the data corresponding to the one or more key values is stored within the local data store: retrieving, using the processor, the data corresponding to the one or more key values from the local data store, and providing, using the processor, data retrieved from the local data store to an application.

The method can also include determining, at the processor, whether a portion of the data corresponding to the one or more key values is not stored in the local data store and is stored in a remote data store, and when a portion of the data corresponding to the one or more key values is not stored in the local data store and is stored in the remote data store: requesting, using the processor, data from the remote data store, and receiving, at the processor, at least a portion of requested data from the remote data store. The method can further include providing, using the processor, data received from the remote data store to the application.

The method can also include updating the graphical user interface based on the selection. The method can further include maintaining the selected key values set when the selection is no longer visible within the graphical user interface.

Providing data received from the local data store to the application and providing data received from the remote data store to the application can include storing received data in a temporary working data store. The method can also include receiving an update to the computer data system data object, wherein the update includes a change to the selection, and performing an update on the selection based on the update to the computer data system data object.

Data returned from the remote data store can include indexes for accessing data stored on remote data store. The method can further include receiving, at the processor, an indication that a new row has been added to the computer data system data object, and determining, using the processor, whether the new row is within the selection based on the selected key values set. The method can also include, if the new row is part of the selection: updating, using the processor, the graphical user interface to indicate the new row is within the selection, and providing, from the processor, the new row to the application. The method can further include resetting the selected key values set when a new selection is received.

Some implementations can include a system for dynamically updating a remote computer data system data object. The system can include a processor coupled to a nontransitory computer readable medium having stored thereon software instructions that, when executed by the processor, cause the processor to perform operations. The operations can include receiving, at a processor, a selection of one or more keyed rows of the computer data system data object, the selection being received from a graphical user interface that is displaying at least a portion of data from the computer data system object. The operations can also include adding, using the processor, one or more key values corresponding to the selection to a selected key values set stored in a computer readable medium coupled to the processor, and receiving, at the processor, an indication of an operation that utilizes data corresponding to the one or more key values. The operations can further include determining, at the processor, whether the data corresponding to the one or more key values is stored within a local data store.

The operations can also include, when the data corresponding to the one or more key values is stored within the local data store: retrieving, using the processor, the data corresponding to the one or more key values from the local data store, and providing, using the processor, data retrieved from the local data store to an application. The operations can further include determining, at the processor, whether a portion of the data corresponding to the one or more key values is not stored in the local data store and is stored in a remote data store.

The operations can also include, when a portion of the data corresponding to the one or more key values is not stored in the local data store and is stored in the remote data store: requesting, using the processor, data from the remote data store, and receiving, at the processor, at least a portion of requested data from the remote data store. The operations can further include providing, using the processor, data received from the remote data store to the application.

The operations can also include updating the graphical user interface based on the selection. The operations can further include maintaining the selected key values set when the selection is no longer visible within the graphical user interface. Providing data received from the local data store to the application and providing data received from the remote data store to the application can include storing received data in a temporary working data store.

The operations can also include receiving an update to the computer data system data object, wherein the update includes a change to the selection, and performing an update on the selection based on the update to the computer data system data object. The data returned from the remote data store can include indexes for accessing data stored on remote data store.

The operations can also include receiving, at the processor, an indication that a new row has been added to the computer data system data object, and determining, using the processor, whether the new row is within the selection based on the selected key values set. The operations can further include, if the new row is part of the selection: updating, using the processor, the graphical user interface to indicate the new row is within the selection, and providing, from the processor, the new row to the application. The operations can also include resetting the selected key values set when a new selection is received.

Some implementations can include a nontransitory computer readable medium having stored thereon software instructions that, when executed by a processor, cause the processor to perform operations. The operations can include receiving, at a processor, a selection of one or more keyed rows of the computer data system data object, the selection being received from a graphical user interface that is displaying at least a portion of data from the computer data system object, and adding, using the processor, one or more key values corresponding to the selection to a selected key values set stored in a computer readable medium coupled to the processor. The operations can also include receiving, at the processor, an indication of an operation that utilizes data corresponding to the one or more key values, and determining, at the processor, whether the data corresponding to the one or more key values is stored within a local data store. The operations can further include when the data corresponding to the one or more key values is stored within the local data store: retrieving, using the processor, the data corresponding to the one or more key values from the local data store, and providing, using the processor, data retrieved from the local data store to an application. The operations can also include determining, at the processor, whether a portion of the data corresponding to the one or more key values is not stored in the local data store and is stored in a remote data store.

The operations can further include, when a portion of the data corresponding to the one or more key values is not stored in the local data store and is stored in the remote data store: requesting, using the processor, data from the remote data store, and receiving, at the processor, at least a portion of requested data from the remote data store. The operations can also include providing, using the processor, data received from the remote data store to the application.

The operations further can include updating the graphical user interface based on the selection. The operations can further include maintaining the selected key values set when the selection is no longer visible within the graphical user interface. Providing data received from the local data store to the application and providing data received from the remote data store to the application can include storing received data in a temporary working data store.

DETAILED DESCRIPTION

Reference may be made herein to the Java programming language, Java classes, Java bytecode and the Java Virtual Machine (JVM) for purposes of illustrating example implementations. It will be appreciated that implementations can include other programming languages (e.g., groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
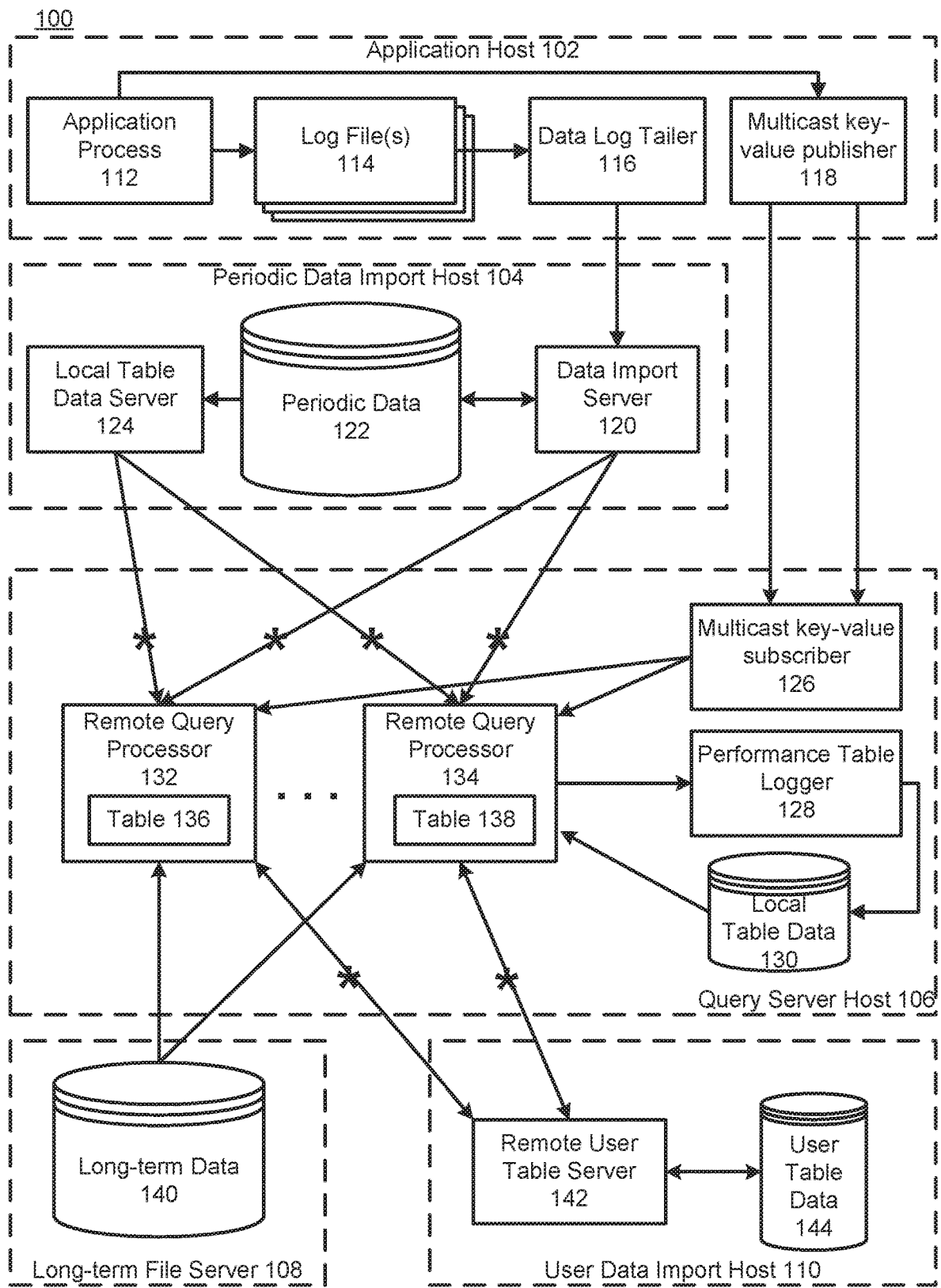
FIG. 1 is a diagram of an example computer data system showing an example data distribution configuration in accordance with some implementations.
Figure 2:
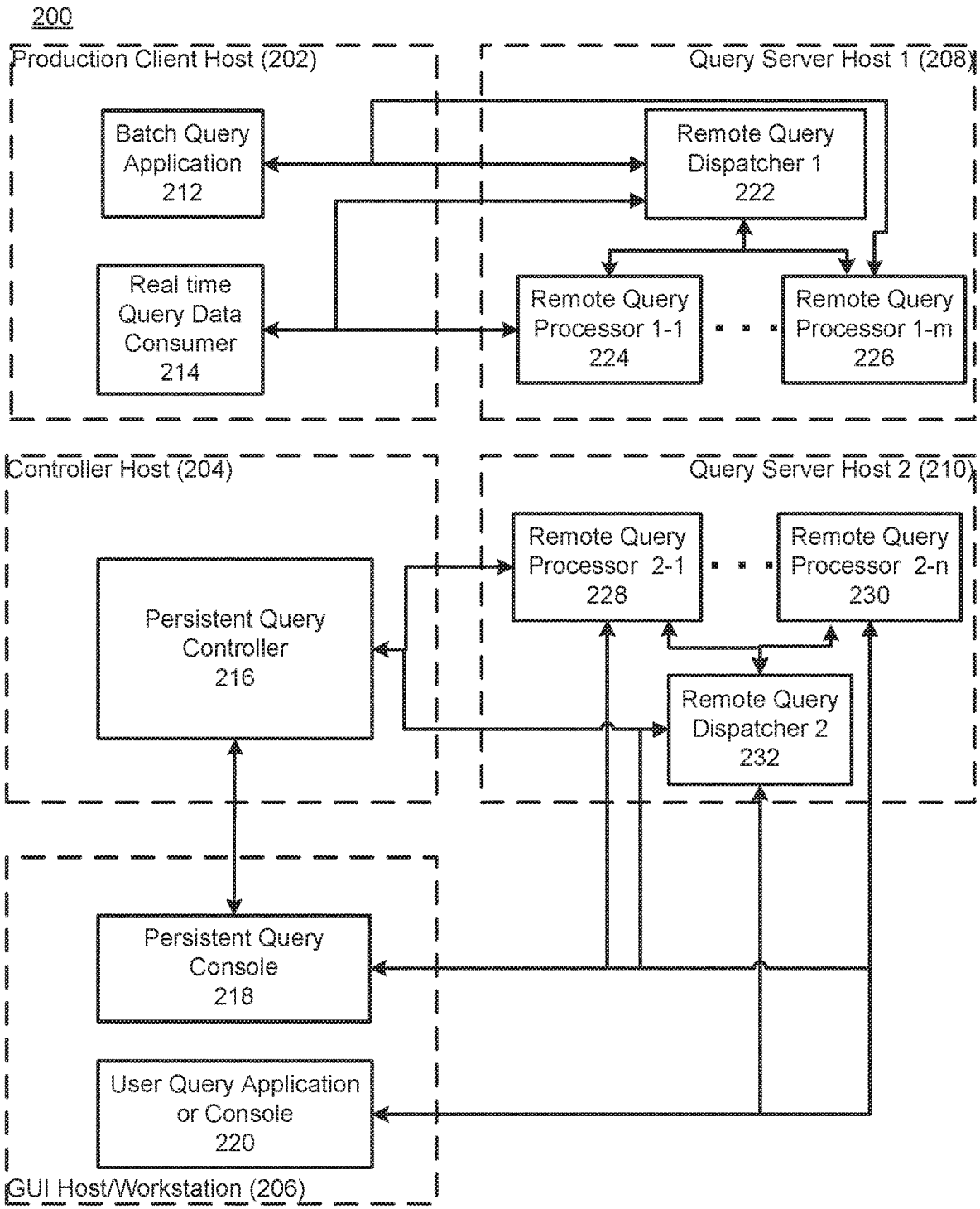
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS, for example.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market opened, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
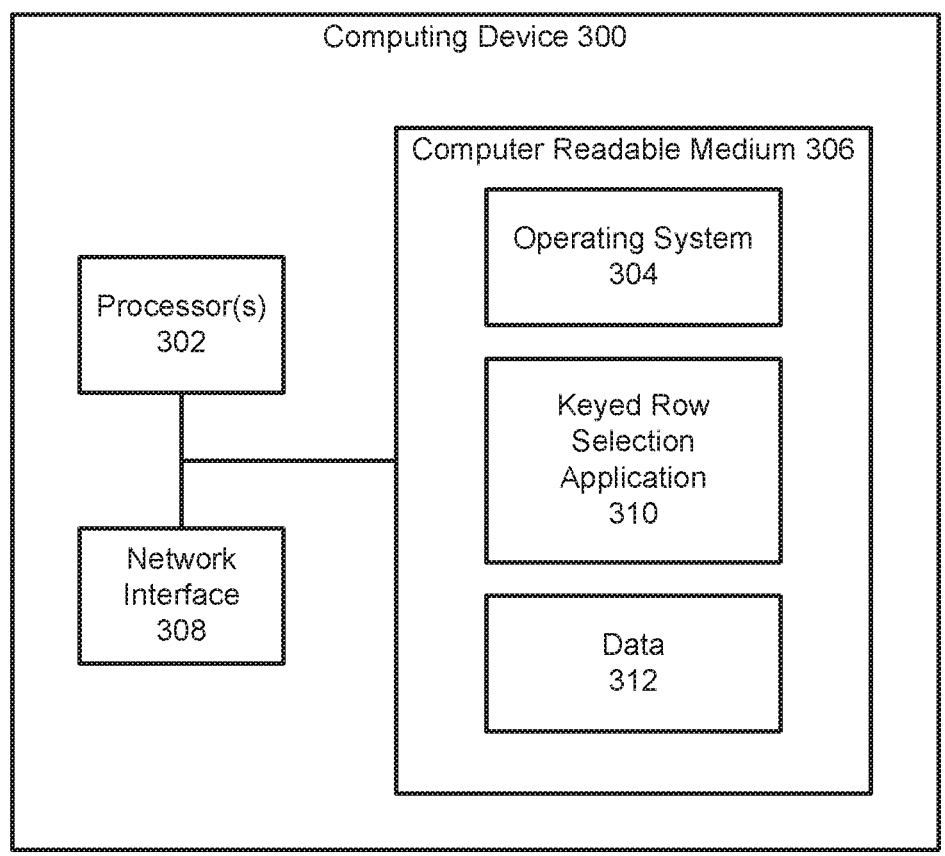
FIG. 3 is a diagram of an example computing device configured for GUI control element processing in accordance with some implementations.

FIG. 3 is a diagram of an example computing device 300 in accordance with at least one implementation. The computing device 300 includes one or more processors 302, operating system 304, computer readable medium 306 and network interface 308. The memory 306 can include a keyed row selection application 310 and a data section 312 (e.g., for storing in-memory tables, etc.).

In operation, the processor 302 may execute the application 310 stored in the memory 306. The application 310 can include software instructions that, when executed by the processor, cause the processor to perform operations for dynamic updating of query result displays in accordance with the present disclosure (e.g., performing one or more of 402-420 described below).

The application program 310 can operate in conjunction with the data section 312 and the operating system 304.

As used herein, a data source can include, but is not limited to, a real time or near real time data source such as securities market data (e.g., over a multicast distribution mechanism (e.g., 118/126) or through a tailer (e.g., 116), system generated data, historical data, user input data from a remote user table server, tables programmatically generated in-memory, or an element upstream in an update propagation graph (UPG) such as a directed acyclic graph (DAG), and/or any data (e.g., a table, mathematical object, etc.) having a capability to refresh itself/provide updated data.

When a data source is updated, it will send add, delete, modify, reindex (AMDR) notifications through the DAG. It will be appreciated that a DAG is used herein for illustration purposes of a possible implementation of the UPG, and that the UPG can include other implementations. A reindex message is a message to change the indexing of a data item, but not change the value. When a table is exported from the server to a client, there is an exported table handle created and that handle attaches itself to the DAG; as a child of the table to be displayed. When the DAG updates, that handle's node in the DAG is reached and a notification is sent across the network to the client that includes the rows which have been added/modified/deleted/reindexed. On the client side, those rows are reconstructed and an in-memory copy of the table (or portion thereof) is maintained for display (or other access).

There can be two cases in which a view is updated. In the first case, a system clock ticks, and there is new data for one or more source (parent) nodes in the DAG, which percolates down to the exported table handle. In the second case, a user changes the "viewport", which is the active set of rows and columns.

There can be various ways the viewport is caused to be updated, such as: (i) scrolling the view of the table, (ii) showing or hiding a table, (iii) when the user or client program programmatically accesses the table, and/or (iv) adding/removing columns from a view. When the viewport is updated, the viewport is automatically adjusted to include the rows/columns that the user is trying to access with exponential expansion up to a limit for efficiency. After a timeout, any automatically created viewports are closed.

A query result may not change without a clock tick that has one or more AMDR messages which traverse the DAG. However, the portion of a query result that is displayed by the user (e.g., the viewport) might change. When a user displays a table, a set of visible columns and rows is computed. In addition to the visible set of rows/columns, the system may compute (and make available for possible display) more data than is visible. For example, the system may compute and make available for possible display three screens of data: the currently visible screen and one screen before and one screen after. If there are multiple views of the same table, either multiple exported table handles are created in which case the views are independent or if a single exported table handle is created, the viewport is the union of the visible sets. As the user scrolls the table, the viewport may change. When the viewport changes, the visible area (with a buffer of rows up and down, and columns left and right, so that scrolling is smooth) is computed and the updated visible area is sent to the server. In response, the server sends a snapshot with relevant portions of those newly visible rows/columns. For non-displayed tables, the visible area can be considered the whole table by the system for further processing so that a consistent table view is available for further processing (e.g., all rows and one or more columns of the data object may be sent to the client).

The snapshot can be generated asynchronously from the DAG update/table refresh loop under the condition that a consistent snapshot (i.e., the clock value remains the same throughout the snapshot) is able to be obtained. If a consistent snapshot is not obtained after a given number of attempts (e.g., three attempts), a lock can be obtained (e.g., the LiveTableMonitor lock) at the end of the current DAG update cycle to lock out updates while the snapshot is created.

Further, the remote query processor (or server) has knowledge of the visible regions and will send data updates for the visible rows/columns (e.g., it can send the entire AMDR message information so the client has information about what has been updated, just not what the actual data is outside of its viewport). This enables the client optionally to cache data even if the data is outside the viewport and only invalidate the data once the data actually changes.

The DAG structure can be maintained in the memory of a remote query processor. Child nodes have hard references back to their parents, and parents have weak references to their children. This ensures that if a child exists, its parent will also exist, but if there are no external references to a child, then a garbage collection event can properly clean the child up (and the parent won't hold onto the child). For the exported table handles, a component (e.g., an ExportedTableHandleManager component) can be configured to hold hard references to the exported tables. If a client disconnects, then the references for its tables can be cleaned up. Clients can also proactively release references.

Figure 4:
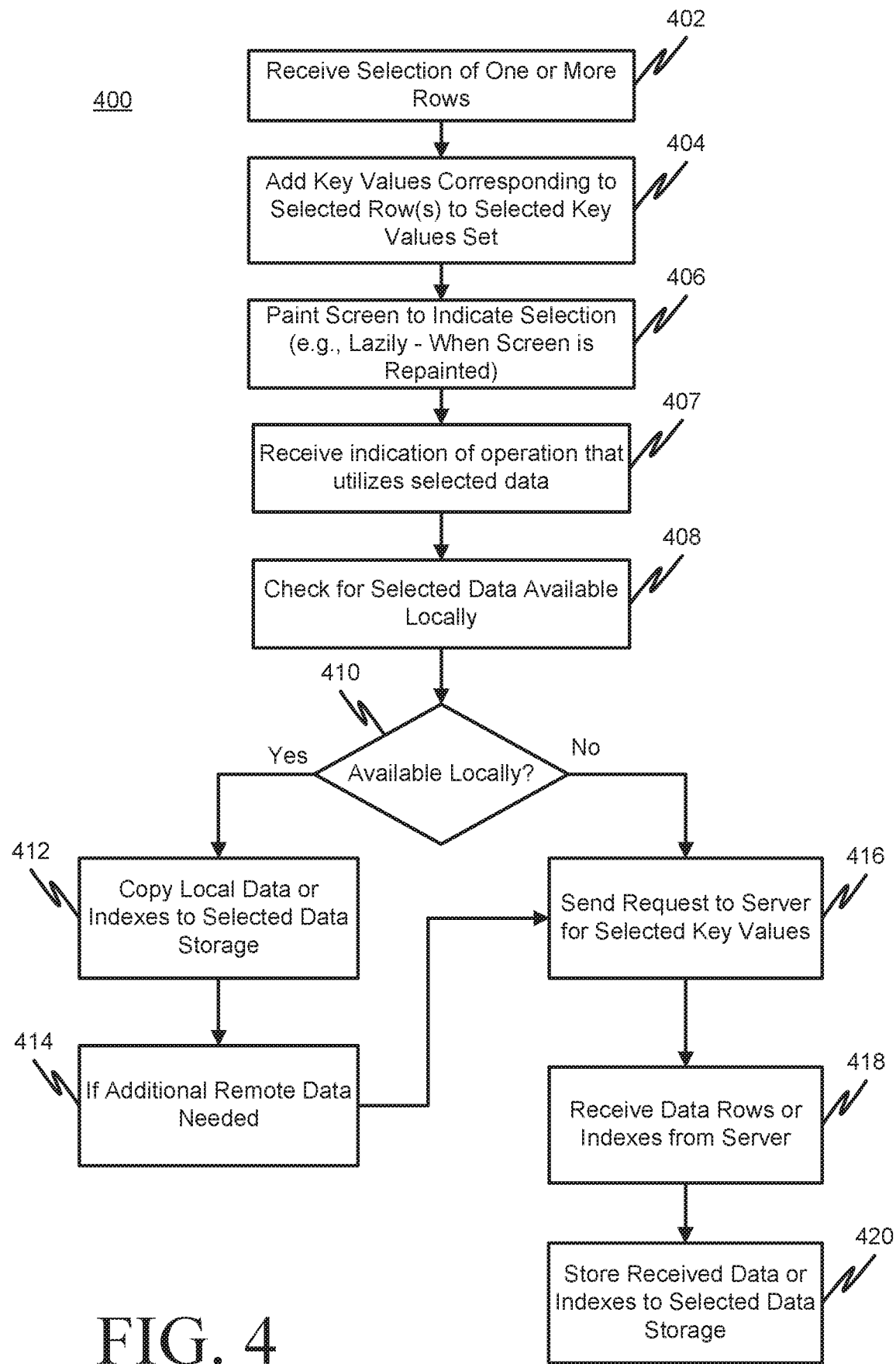
FIG. 4 is a flowchart of an example method for keyed row data selection and processing in accordance with some implementations.

FIG. 4 is a flowchart of an example method 400 for keyed row data selection and processing in accordance with some implementations. Processing begins at 402, where a selection of one or more rows within a computer data system data object or data source is received. The selection can be received from a graphical user interface (GUI) displaying a portion of the data object or data source and can be based on one or more rows selected by a user in the GUI (e.g., via mouse click and/or drag of a row or a field within a row, combination of keyboard command and mouse action, touch screen input, voice input, keyboard input, etc.). A user can select multiple rows using input commands such as mouse input in combination with keyboard input (e.g., mouse clicking while pressing a CTRL or Shift key on a key board, etc.).

The selected row(s) can include a key field. The key can be unique or non-unique. For example, if the data object is keyed on a given field, the selection of a row can cause the system to automatically select the other rows in the data object having a key field that matches the key field value of the one or more rows that were selected by the user. Matching can include an exact match of a key field value or matching when a key field value is within a given threshold number of a key field value of a selected row. Processing continues to 404.

At 404, one or more key values corresponding to the one or more selected are added to a selected key values set. For example, a key value is read from a row that was selected by a user and the key value from the selected row (or rows) is added to the selected key values set. Processing continues to 406.

At 406, the GUI is refreshed (or repainted) to show the selected row(s). The repainting of the GUI to reflect the selection can be performed "lazily", according to the GUI refresh rate, or when processing permits. Processing continues to 407.

At 407, an indication of an operation that utilizes data from rows corresponding to the selected key values set is received. For example, an indication of a copy operation can be received (e.g., when a user performs a copy operation via keystroke such as control-C or via mouse operation or menu selection). The copy operation references the selected row(s). Other operations could utilize the selected rows. Processing continues to 408.

At 408, once the indication of an operation that utilizes the selected row(s), the system can determine whether the data is present in a local data store (e.g., within the local memory of a client device or system). Programmatically determining whether data from the selected row(s) is present locally can be accomplished by comparing indexes of rows corresponding to the selected key value set to the indexes of rows stored in the local data store. It will be appreciated that the there can be at least three ranges of rows (or other data aspects) associated with a data object: a range of data visible within the GUI, a range of data stored in a local data store and a range of data stored in a remote data store. Processing continues to 410.

At 410, it is determined whether data corresponding to the selected row(s) is available locally. If the data, or a portion of the data, is available locally, processing continues to 412. If there is no locally available data corresponding to the selection, processing continues to 416. In some implementations, the system may choose to ignore local data if there is a possibility that some data may not be local. By ignoring local data, the system can help ensure that a consistent snapshot of data is created on the remote data store rather than producing potentially inconsistent results (e.g., with some data from a local store and some from a remote store) in the face of concurrent update operations.

At 412, the local data and/or indexes to the local data are copied to a local temporary working data store (e.g., clipboard memory, scratchpad storage, etc.). Processing continues to 414.

At 414, if the system determines that additional data is needed beyond the data locally available (e.g., when a portion of the data corresponding to the selected row(s) is available from the local data store and a portion is not available in the local data store), processing continues to 416.

At 416, a requesting system (e.g., a remote query processor, a client system, etc.) sends a request to a remote data server (e.g., 104 or 108) for data from a remote data store corresponding to the selected key value set. For example, the system could send a request for data from a remote data store in which a given key field has a value matching one of the values in the selected key value set. Processing continues to 418.

At 418, the requesting system receives data rows or indexes to the requested data in the remote data store. The remote data server may provide a copy of the data if the size of the data being provided is less than a threshold size. If the size of the data being provided is greater than the threshold data size, then the remote data server may provide a set of indexes into one or more remote data objects so that the requesting system can retrieve the data as memory space, time, etc. permit. By providing the indexes of the remote data, the system can improve the performance of a distributed computer data system in which a client system may not have sufficient memory, processing, network or other resources to accommodate the amount of data represented by the selection or the selected key value set. Processing continues to 420.

At 420, the data and/or indexes corresponding to the selected key value set is stored in a selected data storage such as a temporary working memory area (e.g., clipboard, memory scratchpad, etc.) for subsequent use. For example, a user may select one or more rows, then provide a copy command (e.g., via control-C or the like). In response, the system may copy the selected data into the clipboard of the user's system (e.g., a client system).

Figure 5:
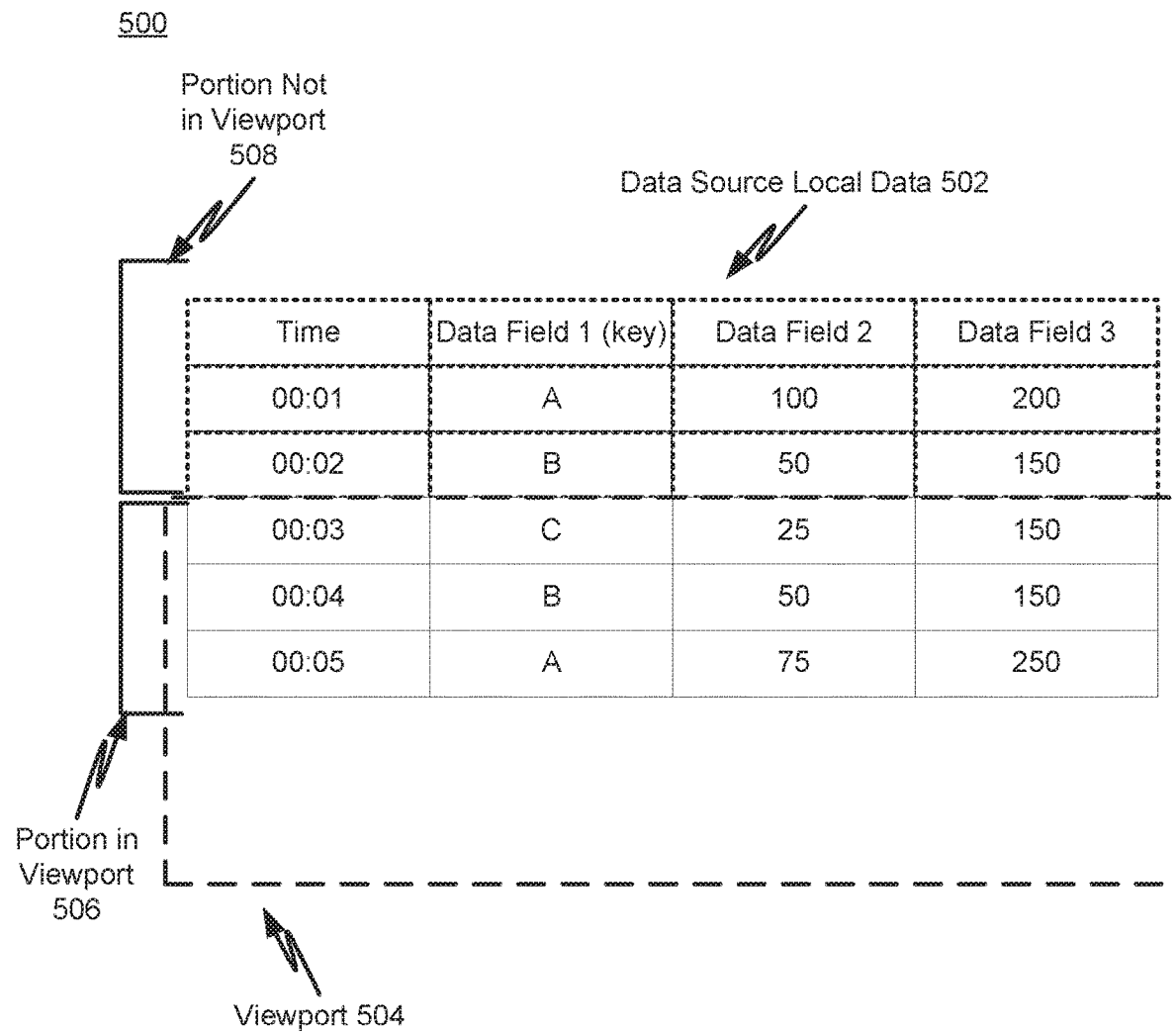
FIG. 5 is a diagram of an example graphical user interface of a computer data system in accordance with some implementations.

FIG. 5 is a diagram of an example graphical user interface 500 (GUI) of a computer data system in accordance with some implementations. The GUI 500 includes data source local data 502, a GUI viewport 504, a portion of data visible within the GUI viewport 506, and a portion of data not visible within the GUI viewport 508.

Figure 6:
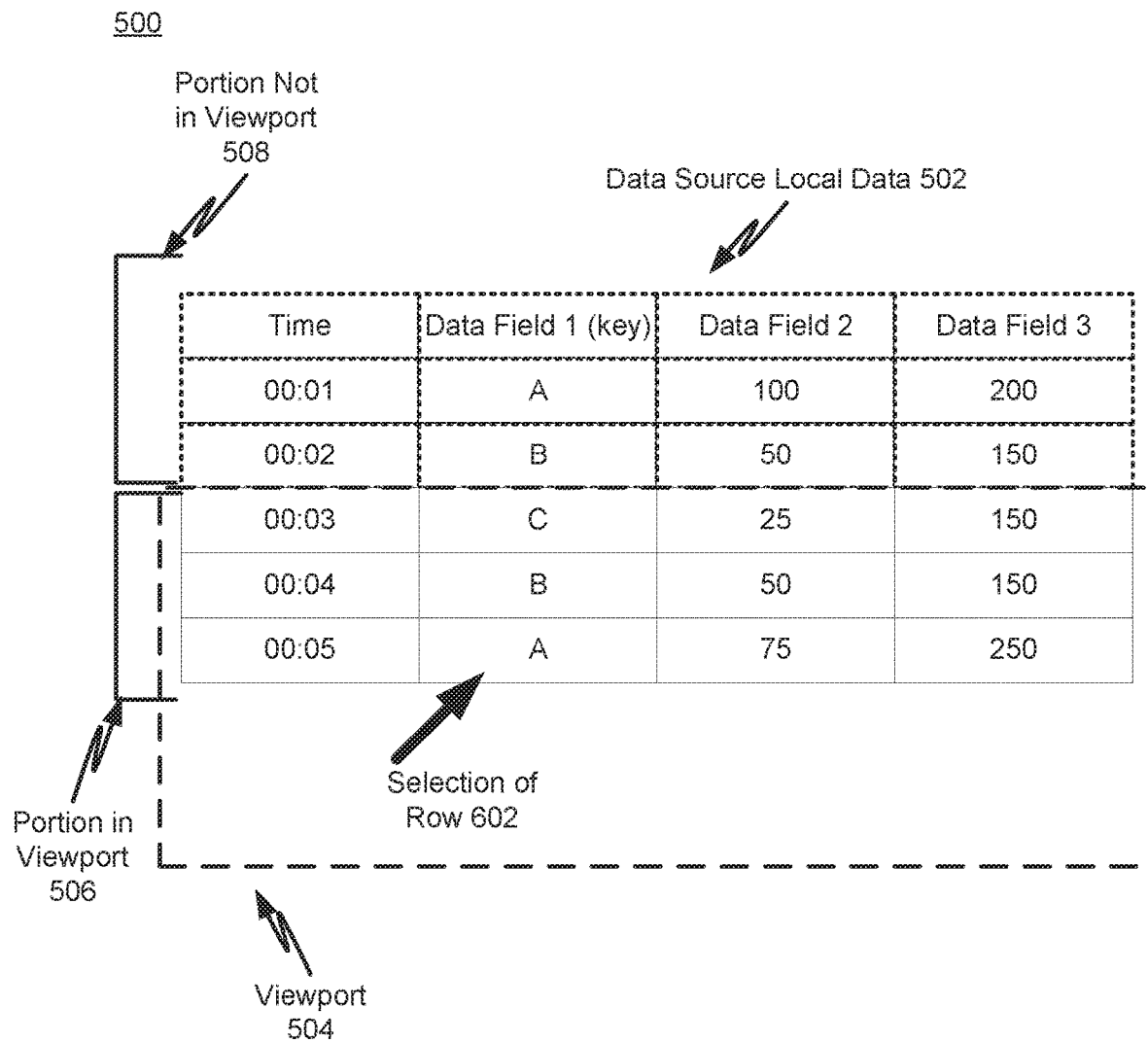
FIG. 6 is a diagram of an example graphical user interface showing a selection of a row of a data object in accordance with some implementations.

FIG. 6 is a diagram of GUI 500 showing a selection of a row of a data object 602. The selected row has a key value of A as shown in the data field 1 column, which is the key field in this example, which is simple for illustration purposes. A key need not be limited to a single value. In some implementations, a key can include a composite of several values to more specifically define rows.

Figure 7:
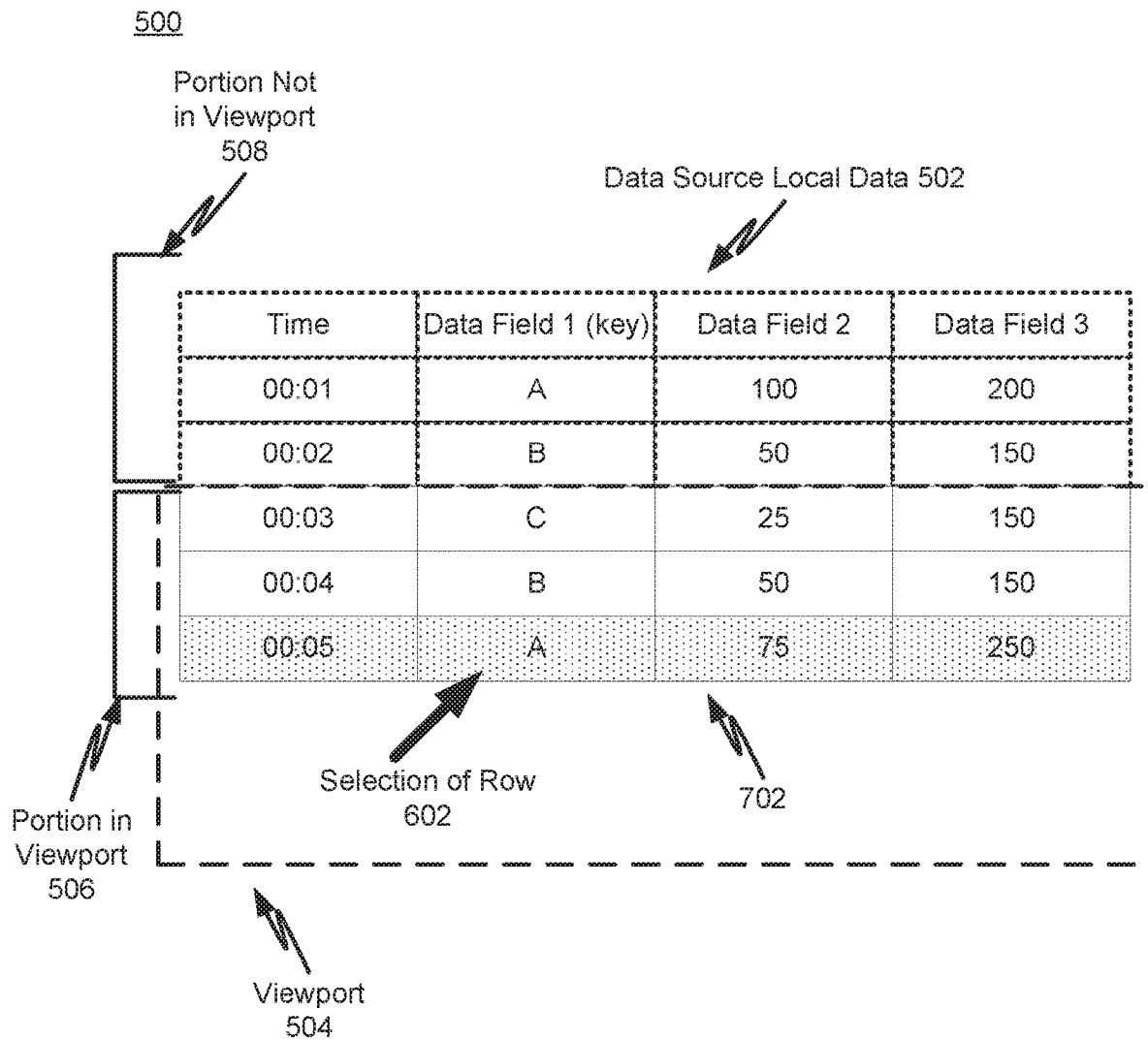
FIG. 7 is a diagram of an example graphical user interface showing a selection of a row of a data object in accordance with some implementations.

FIG. 7 is a diagram of GUI 500 a selection of a row 702 of the data object. As shown in FIG. 7, the row has been displayed as selected (e.g., has different background formatting or other display attributes from the unselected rows within the viewport).

Figure 8:
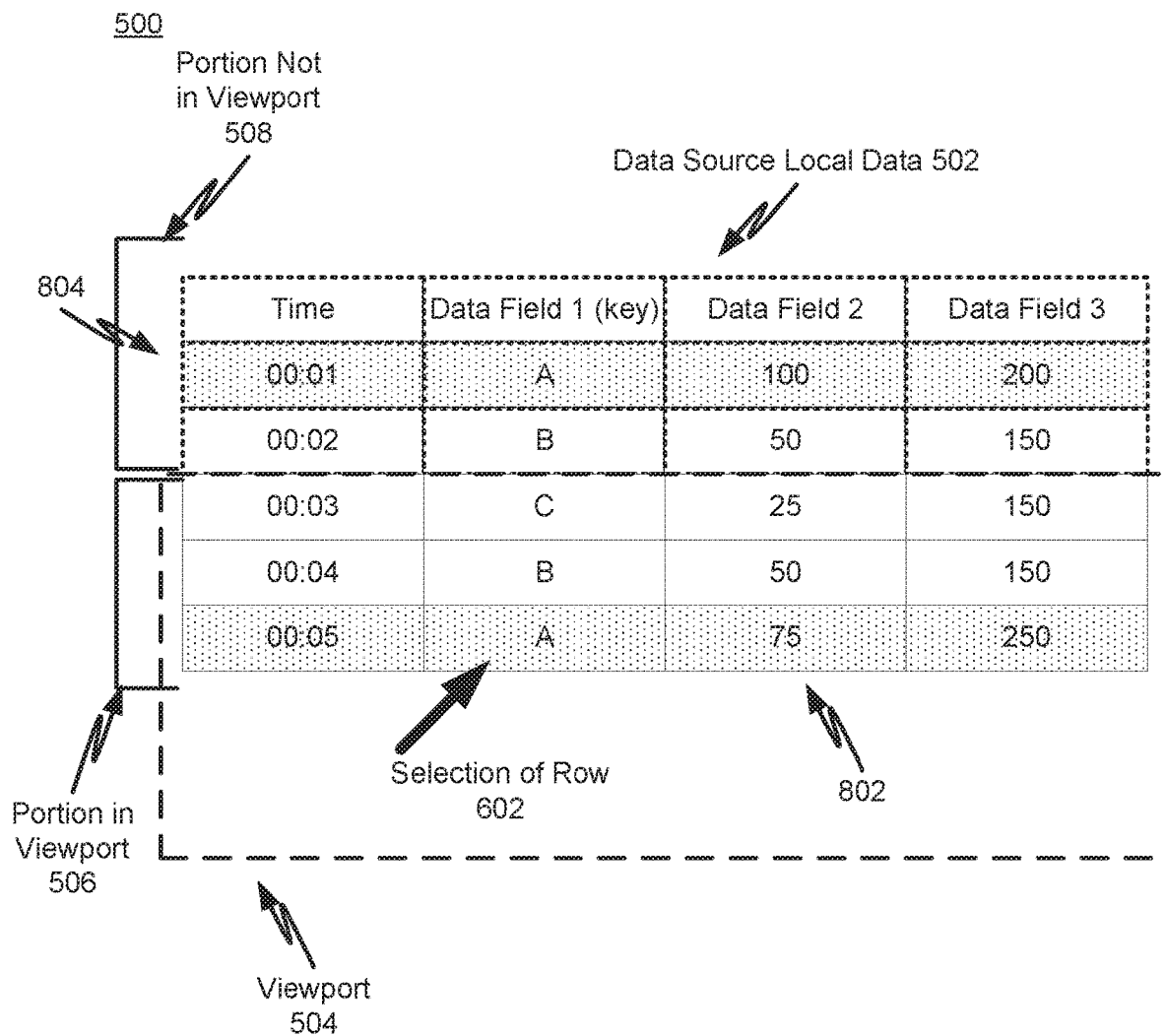
FIG. 8 is a diagram of an example graphical user interface showing selection expansion for a key value of a data object in accordance with some implementations.
Figure 9:
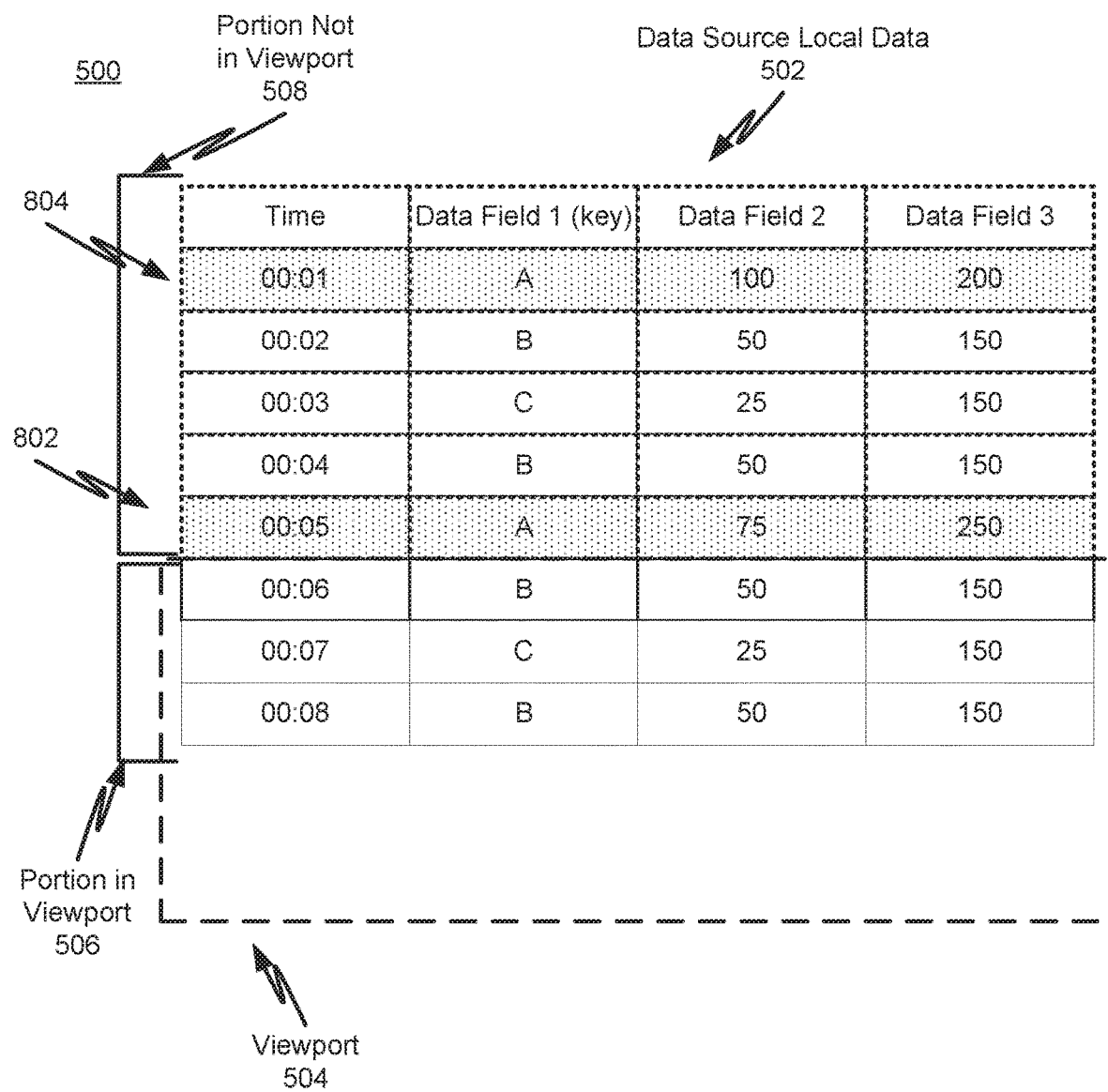
FIG. 9 is a diagram of an example graphical user interface of a computer data system in which the selected rows are no longer visible in accordance with some implementations.

FIG. 8 is a diagram of the GUI 500 showing selection expansion for a key value of a data object. In particular, the selection has been automatically expanded from the row the user selected to include other rows having a key value of A (802 and 804). The key value can be read from the selected row(s) and added to the selected key value set. FIG. 9 is a diagram of the GUI 500 in which the selected rows (802 and 804) are no longer visible within the GUI view port 504. For example, the data object (e.g., a table) may be updating dynamically and new rows have been added and caused the selected rows to move outside of the viewport 504. The selected data persists as selected via the selected value set even though selected rows may no longer be visible within the viewport 504. In some implementations, the GUI may maintain selected data as visible within a viewport by recomputing location and recentering the viewport to show some or all of the selected data.

In some implementations, a selected row may be removed from a data object and the key value for the removed row may be maintained in the selected key value set until the selected key value set is cleared (e.g., by receiving a new selection, which clears the previous selection). In some implementations, when a selected row changes, the change may not alter the selection (e.g., the selected key value set).

Figure 10:
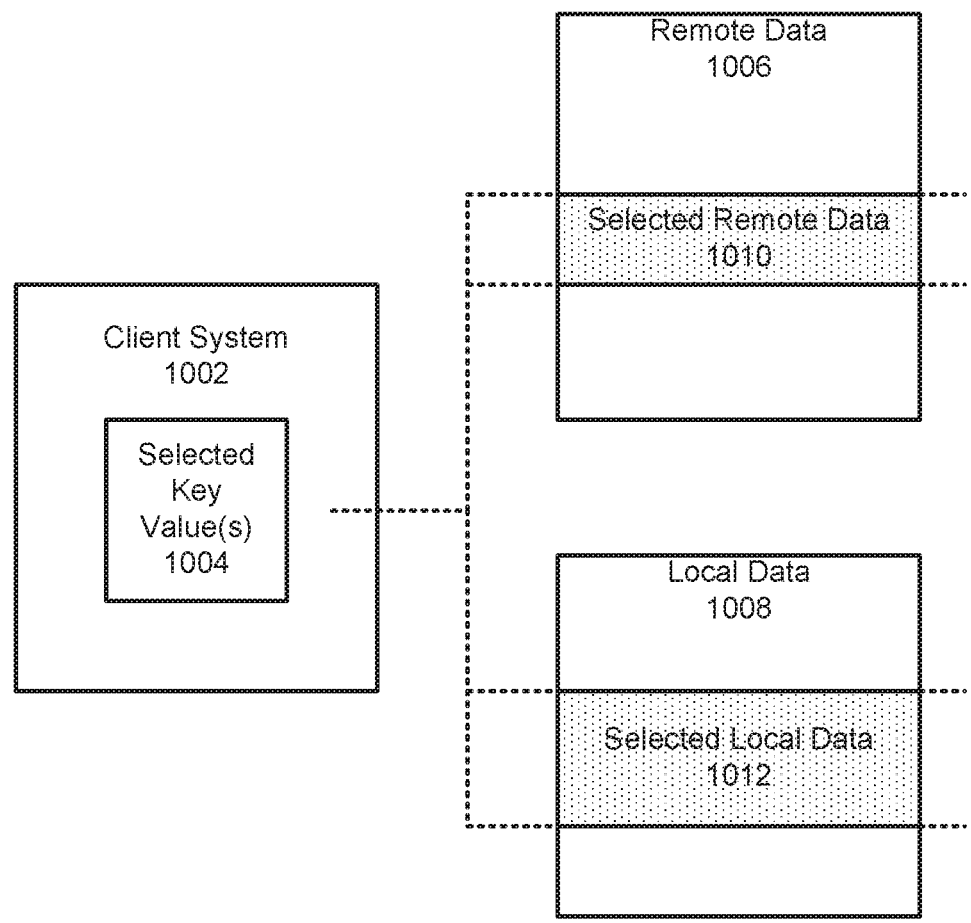
FIG. 10 is a diagram showing an example selected data portion existing in a local data store and a remote data store in accordance with some implementations.

FIG. 10 is a diagram showing an example of selected key values 1004 corresponding to selected local data 1012 within a local data store 1008 and selected remote data 1010 within a remote data store 1006.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), GPGPU, GPU, or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for keyed row selection and data processing operations using selected data.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION, AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

Application Ser. No. 15/351,429, entitled "QUERY TASK PROCESSING BASED ON MEMORY ALLOCATION AND PERFORMANCE CRITERIA" and filed in the United States Patent and Trademark Office on Nov. 14, 2016, is hereby incorporated by reference herein in its entirety as if fully set forth herein.

Application Ser. No. 15/813,112, entitled "COMPUTER DATA SYSTEM DATA SOURCE REFRESHING USING AN UPDATE PROPAGATION GRAPH HAVING A MERGED JOIN LISTENER" and filed in the United States Patent and Trademark Office on Nov. 14, 2017, is hereby incorporated by reference herein in its entirety as if fully set forth herein.

Application Ser. No. 15/813,142, entitled "COMPUTER DATA SYSTEM DATA SOURCE HAVING AN UPDATE PROPAGATION GRAPH WITH FEEDBACK CYCLICALITY" and filed in the United States Patent and Trademark Office on Nov. 14, 2017, is hereby incorporated by reference herein in its entirety as if fully set forth herein.

Application Ser. No. 15/813,127, entitled "COMPUTER DATA DISTRIBUTION ARCHITECTURE CONNECTING AN UPDATE PROPAGATION GRAPH THROUGH MULTIPLE REMOTE QUERY PROCESSORS" and filed in the United States Patent and Trademark Office on Nov. 14, 2017, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A nontransitory computer readable medium having stored thereon software instructions that, when executed by one or more processors, cause the processors to perform operations including:
    receiving, at a processor, a selection of one or more keyed rows of the computer data system data object, the selection being received from a graphical user interface that is displaying at least a portion of data from the computer data system data object;
    in response to receiving the selection, when the computer data system data object is keyed on a given key field, automatically selecting other rows in the computer data system data object having a key field that is within a predetermined threshold value of the given key field of the one or more keyed rows in the received selection;
    adding, using the processor, one or more key values corresponding to the selection to a selected key values set stored in a computer readable medium coupled to the processor;
    receiving, at the processor, an indication of an operation that utilizes data corresponding to the one or more key values;
    determining, at the processor, whether the data corresponding to the one or more key values is stored within a local data store;
    when the data corresponding to the one or more key values is stored within the local data store:
        retrieving, using the processor, the data corresponding to the one or more key values from the local data store,
        providing, using the processor, data retrieved from the local data store to an application;
    determining, at the processor, whether a portion of the data corresponding to the one or more key values is not stored in the local data store and is stored in a remote data store;
    when a portion of the data corresponding to the one or more key values is not stored in the local data store and is stored in the remote data store:
        requesting, using the processor, data from the remote data store,
        receiving, at the processor, at least a portion of requested data from the remote data store, and
        providing, using the processor, data received from the remote data store to the application; and
    persisting selected key values as selected based on the selection within the graphical user interface when the selection is no longer visible within a viewable area of the graphical user interface.

2. The nontransitory computer readable medium of claim 1, the operations further comprising updating the graphical user interface based on the selection.

3. The nontransitory computer readable medium of claim 1, wherein the one or more key values are one or more of a single value or a composite of several values that specifically define the one or more keyed rows.

4. The nontransitory computer readable medium of claim 1, wherein providing data received from the local data store to the application and providing data received from the remote data store to the application include storing received data in a temporary working data store.

5. The nontransitory computer readable medium of claim 1, the operations further comprising:
    receiving an update to the computer data system data object, wherein the update includes a change to the selection; and
    performing an update on the selection based on the update to the computer data system data object.

6. The nontransitory computer readable medium of claim 1, wherein the data returned from the remote data store includes indexes for accessing data stored on remote data store.

7. The nontransitory computer readable medium of claim 1, the operations further comprising:
    receiving, at the processor, an indication that a new row has been added to the computer data system data object;
    determining, using the processor, whether the new row is within the selection based on the selected key values set; and
    if the new row is part of the selection:
        updating, using the processor, the graphical user interface to indicate the new row is within the selection, and
        providing, from the processor, the new row to the application.

8. The nontransitory computer readable medium of claim 1, the operations further comprising resetting the selected key values set when a new selection is received.

9. The nontransitory computer readable medium of claim 1, wherein at least part of the data corresponding to the one or more key values is not displayed within the graphical user interface.

10. A system for dynamically updating a remote computer data system data object, the system comprising:
    a processor coupled to a nontransitory computer readable medium having stored thereon software instructions that, when executed by the processor, cause the processor to perform operations including:
        receiving a selection of one or more keyed rows of the computer data system data object, the selection being received from a graphical user interface that is displaying at least a portion of data from the computer data system data object;
        in response to receiving the selection, when the computer data system data object is keyed on a given key field, automatically selecting other rows in the computer data system data object having a key field that is within a predetermined threshold value of the given key field of the one or more keyed rows in the received selection;
        adding one or more key values corresponding to the selection to a selected key values set stored in a computer readable medium coupled to the processor;
        receiving an indication of an operation that utilizes data corresponding to the one or more key values;
        retrieving the data corresponding to the one or more key values from one or more data stores including a local data store and/or a remote data store;
        providing data retrieved from the one of more data stores to an application; and
    persisting selected key values as selected based on the selection within the graphical user interface when the selection is no longer visible within a viewable area of the graphical user interface.

11. The system of claim 10, wherein the operations further include updating the graphical user interface based on the selection.

12. The system of claim 10, wherein the one or more key values are one or more of a single value or a composite of several values that specifically define the one or more keyed rows.

13. The system of claim 10, wherein providing data received from the one or more data stores to the application includes storing received data in a temporary working data store.

14. The system of claim 10, wherein the operations further include:
receiving an update to the computer data system data object, wherein the update includes a change to the selection; and
performing an update on the selection based on the update to the computer data system data object.

15. The system of claim 10, wherein the data retrieved from the one or more data stores includes data retrieved from the remote data store, and wherein the data retrieved from the remote data store includes indexes for accessing data stored on the remote data store.

16. The system of claim 10, wherein the operations further include:
receiving an indication that a new row has been added to the computer data system data object;
determining whether the new row is within the selection based on the selected key values set; and
if the new row is part of the selection:
updating the graphical user interface to indicate the new row is within the selection, and
providing the new row to an application.

17. The system of claim 10, further comprising resetting the selected key values set when a new selection is received from the graphical user interface including adding to the selected key values set one or more new key values corresponding to the new selection received from the graphical user interface.

18. The system of claim 10, wherein at least part of the data corresponding to the one or more key values is not displayed within the graphical user interface.

19. A computer-implemented method for processing keyed row selection of a computer data system data object, the method comprising:
receiving, at a processor, a selection of one or more keyed rows of the computer data system data object, the selection being received from a graphical user interface that is displaying at least a portion of data from the computer data system data object;
in response to receiving the selection, when the computer data system data object is keyed on a given key field, automatically selecting other rows in the computer data system data object having a key field that is within a predetermined threshold value of the given key field of the one or more keyed rows in the received selection;
adding, using the processor, one or more key values corresponding to the selection to a selected key values set stored in a computer readable medium coupled to the processor;
receiving, at the processor, an indication of an operation that utilizes data corresponding to the one or more key values;
retrieving, using the processor, the data corresponding to the one or more key values from one or more data stores including a local data store and/or a remote data store;
providing, using the processor, data retrieved from the one or more data stores to an application; and
persisting selected key values as selected based on the selection within the graphical user interface when the selection is no longer visible within a viewable area of the graphical user interface.

20. The computer-implemented method of claim 19, further comprising updating the graphical user interface based on the selection, wherein the graphical user interface is updated in one of: according to a graphical user interface refresh rate or when processing allows for the update.

21. The computer-implemented method of claim 19, further comprising:
receiving an update to the computer data system data object, wherein the update includes a change to the selection; and
performing an update on the selection based on the update to the computer data system data object.

22. The computer-implemented method of claim 19, wherein the one or more key values is a composite of several values that specifically correspond to the one or more keyed rows.

23. The computer-implemented method of claim 19, wherein one or more changes to data corresponding to the selection does not change the one or more key values until the selected key values set is cleared.

24. The computer-implemented method of claim 19, wherein the data retrieved from the one or more data stores includes data retrieved from the remote data store, and wherein the data retrieved from the remote data store includes indexes for accessing data stored on the remote data store.

25. The computer-implemented method of claim 19, further comprising:
receiving, at the processor, an indication that a new row has been added to the computer data system data object;
determining, using the processor, whether the new row is within the selection based on the selected key values set; and
if the new row is part of the selection:
updating, using the processor, the graphical user interface to indicate the new row is within the selection, and
providing, from the processor, the new row to the application.

26. The computer-implemented method of claim 19, further comprising resetting the selected key values set when a new selection is received from the graphical user interface including adding to the selected key values set one or more new key values corresponding to the new selection received from the graphical user interface.

27. The computer-implemented method of claim 19, wherein at least part of the data corresponding to the one or more key values is not displayed within the graphical user interface.

* * * * *